(12) United States Patent  
Chu (10) Patent No.: US 6,480,126 B1
(45) Date of Patent: Nov. 12, 2002

(54) PHASE DIGITIZER (75) Inventor: David C. Chu, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/003,798

(22) Filed: Oct. 26, 2001

(51) Int. Cl.$^7$ ................................................ H03M 1/48
(52) U.S. Cl. ...................................................... 341/111
(58) Field of Search ................................. 341/111, 112, 341/113, 114, 115, 116

(56) References Cited

U.S. PATENT DOCUMENTS 6,049,297 A * 4/2000 Ducharme .................. 341/111

* cited by examiner

Primary Examiner—Brian Young (57) ABSTRACT

A system and method of digitizing characteristic parameters of a quasi-sinusoidal analog signal of unknown magnitude, frequency and phase-offset, includes digitizing the analog signal at a first sampling rate, thereby generating a plurality of sets of digital signal waveform samples. Successive sets of the digital signal waveform samples are digitally processed to generate continually updated digital characteristic parameters representing a characteristic behavior of the quasi-sinusoidal analog signal.

34 Claims, 4 Drawing Sheets

PHASE DIGITIZER

THE FIELD OF THE INVENTION

This invention relates generally to systems and methods for digitizing the phase of an analog signal. This invention relates more particularly to a system and method for continuously and accurately digitizing the cumulative phase progression of a quasi-sinusoidal signal based on digital samples of its waveform.

BACKGROUND OF THE INVENTION

Many existing phase detectors are analog in nature and have a limited dynamic range. Generally, such phase detectors generate an output voltage indicative of the phase difference between two oscillations that are close in frequency. The polarity of the output voltage indicates which oscillation is leading the other. The magnitude of the output voltage tends to be proportional to the phase difference. The dynamic range of such phase detectors is typically limited to one cycle in each direction. Digital phase detection is typically preferred for phase detection of dynamic ranges wider than 1 or 2 cycles.

A prior method of digitizing phase that has very wide dynamic range is described in U.S. Pat. No. 5,663,666, entitled DIGITAL PHASE DETECTOR, by Chu and Sommer. Such a method can be used only on a signal operating within a very narrow frequency band, 100 ppm for example, such as a signal from a crystal oscillator.

Another prior method of phase digitizing involves time-stamping the zero-crossings of the signal, as described in "Phase Digitizing Sharpens Timing Measurements," David Chu, IEEE Spectrum, July 1988, pp. 28–32. For precise results, such methods usually involve custom time-digitizer circuits, such as described in U.S. Pat. No. 5,166,959, entitled PICOSECOND EVENT TIMER, by Chu and Knotts. Phase digitizing techniques that involve time-stamping the zero-crossings of a signal are better suited for agile signals of high frequencies, where signal frequencies may change radically and suddenly, and many zero-crossings are available to generate time-stamp data. A penalty for such a wide-band approach is noise.

In an interferometer arrangement, noise is usually generated from fluctuating beam alignment, turbulence, photodiodes, electronic amplification and from the light source itself. In noisy environments, unexpected spurious zero-crossings may occur due to multiple triggering of the same signal edge, causing a catastrophic failure in previous phase digitizing processes.

In metrology of moving objects, the signals are generally quasi-sinusoidal and of limited agility due to the physical inertia of objects being monitored. Frequency is proportional to the velocity of the object being monitored, and phase is proportional to the distance of travel. Because physical objects cannot instantaneously jump from one velocity to a much different velocity, the frequency of the signals changes relatively slowly.

The frequency of the signal, although changing slowly, may traverse a wide range, including very low frequencies where the number of zero-crossings available for measurement may be at a premium. Also, the occurrences of zero-crossings are generally non-uniform. This non-uniformity may pose additional difficulty in ascertaining the "data age"—the time between event occurrence and the presentation of its measurement data. These factors render the zero-crossing approach not an optimum technique for phase digitizing for interferometry.

It would be desirable to provide a phase digitizing system and method that employs digital signal processing for continuously generating digital phase data representing the phase of an incoming analog signal, without the disadvantages of previous phase digitizing techniques.

SUMMARY OF THE INVENTION

One form of the present invention provides a method of digitizing characteristic parameters of a quasi-sinusoidal analog signal of unknown magnitude, frequency and phase-offset. The analog signal is digitized at a first sampling rate, thereby generating a plurality of sets of digital signal waveform samples. Successive sets of the digital signal waveform samples are digitally processed to generate continually updated digital characteristic parameters representing a characteristic behavior of the quasi-sinusoidal analog signal.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Displacement Measuring Interferometry System

The phase digitizing system and method of the present invention is discussed in the context of a displacement measuring interferometry system. However, the phase digitizing techniques disclosed herein are also applicable to any other application in which it is desirable to continuously generate digital phase data representing the phase of an incoming analog signal.

A typical displacement measuring interferometer system consists of a frequency-stabilized laser light source, interferometer optics and measuring electronics. In metrology based on homodyne interferometry, the phase progression function $\phi(t)$ is directly proportional to the object displacement in time, t, usually by the factor $\lambda/4$. That is, one unit interval (UI) change represents an object movement of one-quarter of the wavelength of the light wave. One UI represents one cycle of the light interference fringe, or $2\pi$ radians. In metrology based on heterodyne interferometry, there are two channels: one Doppler-shifted (Measurement Channel), and the other not shifted (Reference Channel). The difference between the two phase progression functions $\phi_R(t)$ and $\phi_M(t)$ of the two channels is proportional to the object displacement to within an arbitrary constant. The phase-progression functions for both channels are monotonically increasing with time.

Figure 1:
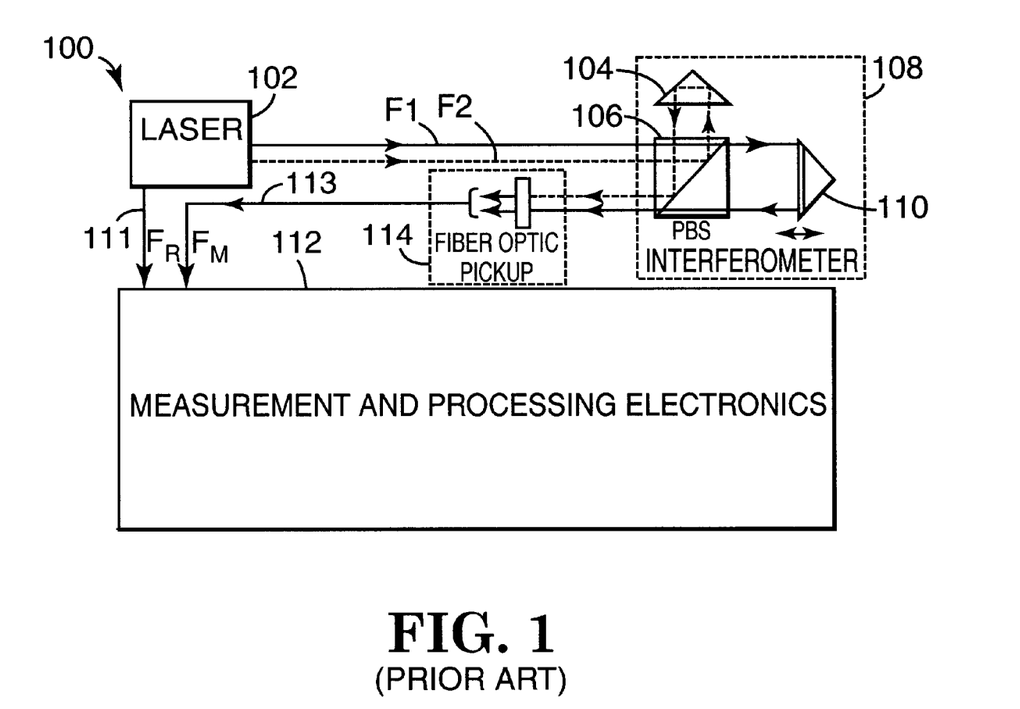
FIG. 1 is a block diagram illustrating a prior art heterodyne displacement measuring interferometer system.

FIG. 1 is a block diagram illustrating a prior art heterodyne displacement measuring interferometer system 100. Interferometer system 100 includes laser 102, interferometer 108, measurement and processing electronics 112, and fiber optic pickup 114. Interferometer 108 includes stationary retroreflector 104, polarizing beam splitter (PBS) 106, and movable retroreflector 110.

Laser 102 generates a pair of collinear, orthogonally-polarized optical beams of equal intensity and of different frequencies $F_1$ and $F_2$, which differ in frequency by $F_R$, which is a reference frequency. The optical beams pass through interferometer 108. Polarization beam splitter 106 reflects one polarization of the incoming light to stationary retroreflector 104, and passes the other polarization of light to movable retroreflector 110. The retroreflectors 104 and 110 return the light to the polarization beam splitter 106, where one beam is transmitted and the other beam is reflected, so that the two beams are again collinear. Linear motion of the movable retroreflector 110 results in a corresponding change in the difference in phase between the two beams. The output beams from interferometer 108 go to fiber optic pick-up 114. In fiber optic pick-up 114, the output beams from interferometer 108 are mixed, and the mixed beam is coupled to an optical fiber 113. The mixed beam is referred to as the measurement signal, and the mixing is represented by the following Equation I:

$$\text{Measurement signal} = F_1 \otimes F_2 \qquad \text{Equation I}$$

where:
- $\otimes$ indicates a mixing operation; and
- the underlining of $F_1$ indicates that the signal is Doppler-shifted.

Measurement and processing electronics 112 contain a fiber optic receiver that produces an electrical measurement signal corresponding to the optical measurement signal. The measurement signal has a frequency that is equal to the reference frequency $F_R$ plus the Doppler shift frequency:

$$F_M = F_R + nv/\lambda \qquad \text{Equation II}$$

where:
- v is the velocity of the interferometer element whose position is being measured (the sign of v indicates the direction of travel);
- $\lambda$ is the wavelength of light emitted from laser 102; and
- n equals 2, 4, etc., depending on the number of passes the light makes through interferometer 108. In embodiments of the present invention, n=4.

In the example system of FIG. 1, the movement of retroreflector 110 produces the Doppler shift and n is equal to 2. Laser 102 also outputs a reference signal at the reference frequency ($F_R$) via a fiber optic cable 111 that goes to a fiber optic receiver in the measurement and processing electronics 112. The reference signal is produced by mixing the two beams from laser 102 ($F_1$ and $F_2$), which is represented by the following Equation III:

$$\text{Reference Signal} = F_1 \otimes F_2 \qquad \text{Equation III}$$

Measurement and processing electronics 112 contain a fiber optic receiver that produces an electrical reference signal corresponding to the optical reference signal. The reference signal has a frequency that is equal to the reference frequency $F_R$.

Measurement and processing electronics 112 measure and accumulate the phase difference between the reference signal and the measurement signal, and process the difference to provide position and velocity outputs.

Previous methods for determining and processing phase information employed analog techniques, or digital techniques that involved time-stamping the zero-crossings of the signal, or techniques that are of limited frequency range. Embodiments of the present invention provide a more effective technique for generating digitized phase information for interferometry applications such as that shown in FIG. 1, as well as any other application where it is desirable to generate digital phase data representing the instantaneous phase of an incoming analog signal.

One embodiment of the present invention is a method of continuously and accurately digitizing the phase progression of a quasi-sinusoidal signal based on digital samples of its waveform. When the signal comes from a Doppler-shifted light wave reflected from a moving object, possibly down-converted by an interferometer, the signal phase is directly proportional to the position of the object. Therefore, continuous signal phase monitoring is equivalent to continuous position monitoring of the object, accurate to a fraction of the light wavelength.

In one form of the invention, a quasi-sinusoidal signal, of unknown and changing frequency, phase, and magnitude is digitized by an analog-to-digital converter (ADC) at a regular rate greater than twice the bandwidth of the signal. The digitized data is analyzed in 256-sample segments. For each 256-sample segment, a "best-fit" estimate of the signal of the form $V*\cos[2\pi(\text{Freq}*i-\theta]$, where i is an index for identifying consecutive digital signal samples within a segment, V represents a magnitude estimate, Freq represents a frequency estimate, and $\theta$ represents a phase-offset estimate.

Two embodiments for phase digitizing are described herein. A block regression embodiment for "best fit" (illustrated in FIG. 2) is simpler to implement, and does not require data multiplication at high speed. In the block regression embodiment, linear regression processing is applied to selected sums of digital signal waveform samples. A point-regression embodiment (illustrated in FIG. 3) offers mathematically the highest accuracy in the minimum squared error sense, but uses two high-speed digital multipliers. In the point regression embodiment, linear regression processing is applied to individual digital signal waveform samples.

II. Block Regression Phase Digitizing Embodiment

Figure 2:
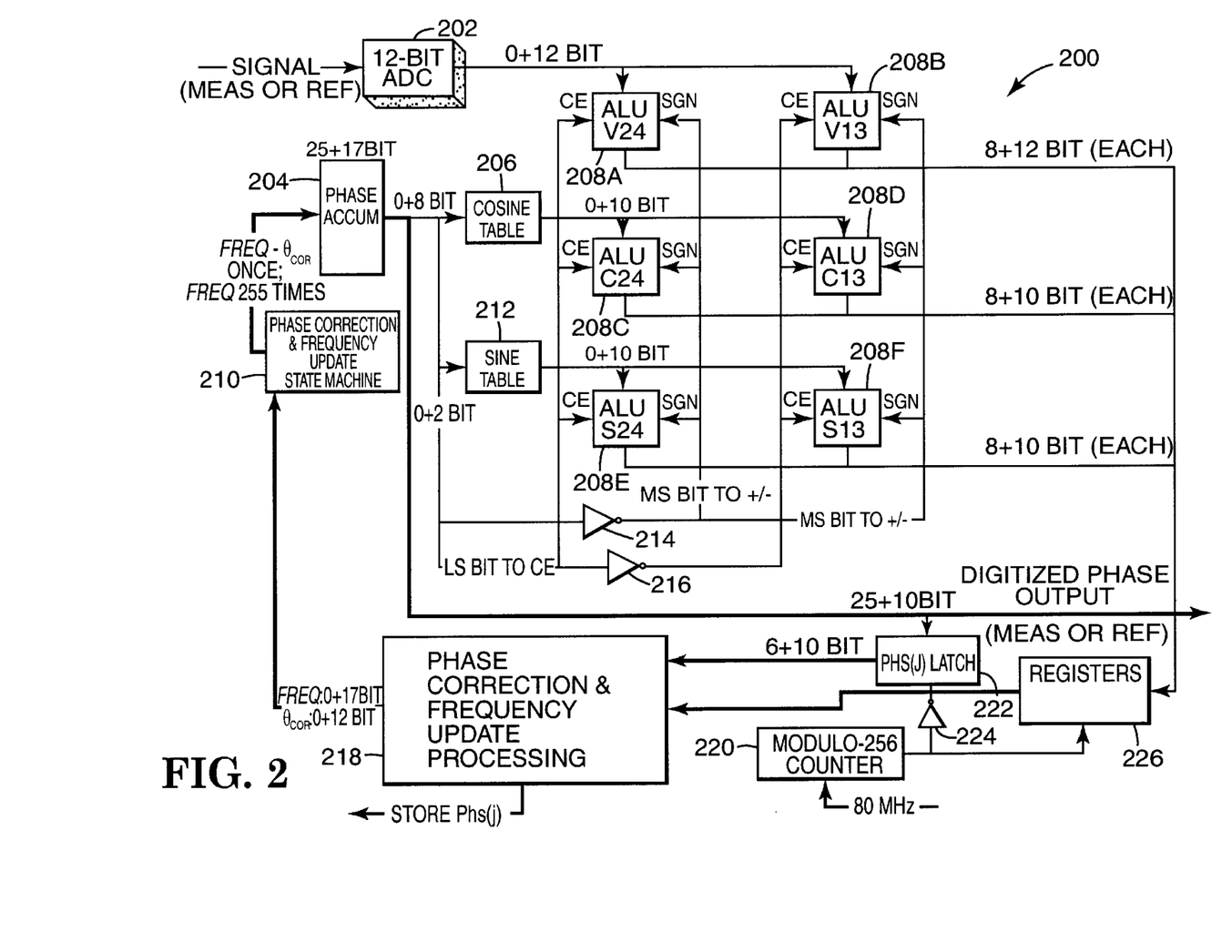
FIG. 2 is an electrical block diagram illustrating a first embodiment of a phase digitizer according to the present invention.

FIG. 2 is an electrical block diagram illustrating a first embodiment of a phase digitizer 200 according to the present invention. Phase digitizer 200 uses a block regression technique for phase digitizing in the steady state. Phase digitizing for only one channel (e.g., measurement or reference) is shown in FIG. 2. Both channels in a heterodyne system operate similarly, and may be digitized in the same manner.

Phase digitizer 200 includes analog-to-digital converter (ADC) 202, phase accumulator 204, cosine table 206, arithmetic logic units (ALUs) 208A–208F (collectively referred to as ALUs 208), phase correction and frequency update state machine 210, sine table 212, inverters 214 and 216, phase correction and frequency update processing block 218, counter 220, latch 222, inverter 224, and registers 226. In one embodiment, the digital circuits shown in FIG. 2 are clocked synchronously at an 80 MHz rate. The clocking circuit is omitted from FIG. 2 to simplify the illustration of the invention. As shown in FIG. 2, no high-speed multiplication circuits for multiplication of data at 80 MHz are used.

A 12-bit ADC 202 digitizes at 80 MHz an incoming AC-coupled signal of unknown magnitude, frequency, and phase. In alternative embodiments, other sampling rates may be used. The output of ADC 202 is monitored simultaneously by two ALUs 208A and 208B.

A 42-bit phase accumulator 204 approximates the signal phase-progression $\phi(t_i)$ of the incoming analog signal, where the index "i" indicates a clock count value. Successive $t_i$'s are separated by $\tau$, the period of 80 MHz. The most significant 25 bits of phase accumulator 204 represent the numbers of whole UI in $\phi(t_i)$, and the remaining 17 bits represent fractional UI in $\phi(t_i)$. The increment value of phase accumulator 204, Freq, is the latest estimate of the signal frequency expressed in UI/$\tau$. An initial seed Freq value is used to start the phase digitizing operation, and is discussed below.

The most significant 8 bits of the fractional output of phase accumulator 204 are used to address cosine look-up table 206 and sine look-up table 212. Look-up tables 206 and 212 each span one complete period in the 8-bit address space. There are, therefore, 256 entries that span one period in each table 206 and 212. Each entry in tables 206 and 212 is 10 bits wide. The output of cosine table 206 is presented to ALU 208C and ALU 208D. The output of sine table 212 is presented to ALU 208E and 208F.

The most significant two bits of the fractional part of the output of phase accumulator 204 control the operations of the six ALUs 208, enabling or disabling them, and assigning the polarity of accumulation for the enabled units as shown in the following Table I:

TABLE I

| bits | Name | Action |
| --- | --- | --- |
| 00 | 1st quadrant | ALUs 208B, 208D, and 208F are enabled to increment, ALUs 208A, 208C, and 208E are disabled |
| 01 | 2nd quadrant | ALUs 208A, 208C, and 208E are enabled to increment, ALUs 208B, 208D, and 208F are disabled |
| 10 | 3rd quadrant | ALUs 208B, 208D, and 208F are enabled to decrement, ALUs 208A, 208C, and 208E are disabled |
| 11 | 4th quadrant | ALUs 208A, 208C, and 208E are enabled to decrement, ALUs 208B, 208D, and 208F are disabled |

Logical control of ALUs 208 is accomplished through the use of inverters 214 and 216, which are wired to the Polarity (SGN) and the Clock Enable (CE) inputs, respectively, of the six ALUs 208. Of the most significant two bits of the fractional part of the output of phase accumulator 204, the most significant bit controls the SGN inputs of the ALUs 208, and the least significant bit controls the CE inputs of the ALUs 208.

In one embodiment, the digitized data from ADC 202 is analyzed in 256-sample segments. A modulo 256 counter 220 sequences the events in each 256-clock segment. Counter 220 is coupled to Phs(j) latch 222 via inverter 224, and is also coupled to registers 226. At the negative transition of counter 220, halfway into a segment, 16 bits of output of phase accumulator 204 (6 bits of whole UI and 10 bits of fractional UI) are latched by Phs(j) latch 222. The latched value represents a temporary mid-segment value, Phs(j), which is held in reserve to be modified at the end of the segment. The letter "j" is an index for identifying segments.

At the positive transition of counter 220 at the end of a segment, the outputs of the six ALUs 208 are latched into 6 registers 226, omitting the 4 least significant bits. The latched values are $V_{13}$, $V_{24}$, $C_{13}$, $C_{24}$, $S_{13}$, and $S_{24}$, which are associated with ALUs 208B, 208A, 208D, 208C, 208F, and 208E, respectively. Immediately after the values are latched, all six ALUs 208 are reset to zero (reset circuit not shown) so that the ALUs 208 are ready for the next segment.

The latched values of the six ALUs 208 are digitally processed by phase correction and frequency update processing block 218 as shown in the following Equations IV through IX:

$$A=V_{13} \cdot S_{24}-V_{24} \cdot S_{13} \qquad \text{Equation IV}$$

$$B=-V_{13} \cdot C_{24}+V_{24} \cdot C_{13} \qquad \text{Equation V}$$

A phase correction value $\theta_{cor}$ is then ideally computed as follows:

$$\theta_{cor}=\text{Arctangent}(B/A)/2\pi \qquad \text{Equation VI}$$

Under steady state condition, however, the quotient B/A is generally small and Arctangent(B/A) is approximately equal to B/A. Therefore, $$\theta_{cor} \approx (B/A)/2\pi \qquad \text{Equation VII}$$

The phase correction $\theta_{cor}$ value, which is always much less than ½, is carried to 12 bits of accuracy.

The temporary mid-segment value Phs(j) latched by Phs(j) latch 222 is now corrected by $\theta_{cor}$ as follows:

$$Phs(j)=Phs(j)-\theta_{cor} \qquad \text{Equation VIII}$$

The corrected Phs(j), together with 320 values from past segments, are stored in memory and exported as measured phase progression values. An updated frequency value, Freq, under steady state, is derived from the current value Phs(j) and two other historical values Phs(j−2) and Phs(j−4) recorded respectively two segments and four segments ago. One embodiment of the formulation for the new steady-state Freq is:

$$Freq=[2 \cdot Phs(j)-3 \cdot Phs(j-2)+Phs(j-4)]/512 \qquad \text{Equation IX}$$

In one form of the invention, phase correction and frequency update processing block 218 is implemented as a field programmable gate array (FPGA). In an alternative embodiment, block 218 is implemented as a DSP processor.

In one embodiment, as soon as computation of $\theta_{cor}$ and Freq values is completed by phase correction and frequency update processing block 218, the increment value of phase accumulator 204 is modified by phase correction and frequency update state machine 210 to Freq−$\theta_{cor}$ for one clock cycle, then Freq for the next 255 clock cycles. The value of Freq, which is always no larger than ½, should be carried to a precision of 17 bits of fraction.

The above process is then repeated for the next 256-sample segment. Throughout the process, the clocked phase accumulator 204 output $\phi(t_i)$ serves as a good digitized representation of the phase progression of the incoming analog signal to 25 bits of whole numbers and 10 bits of fractional numbers.

III. Point Regression Phase Digitizing Embodiment

Figure 3:
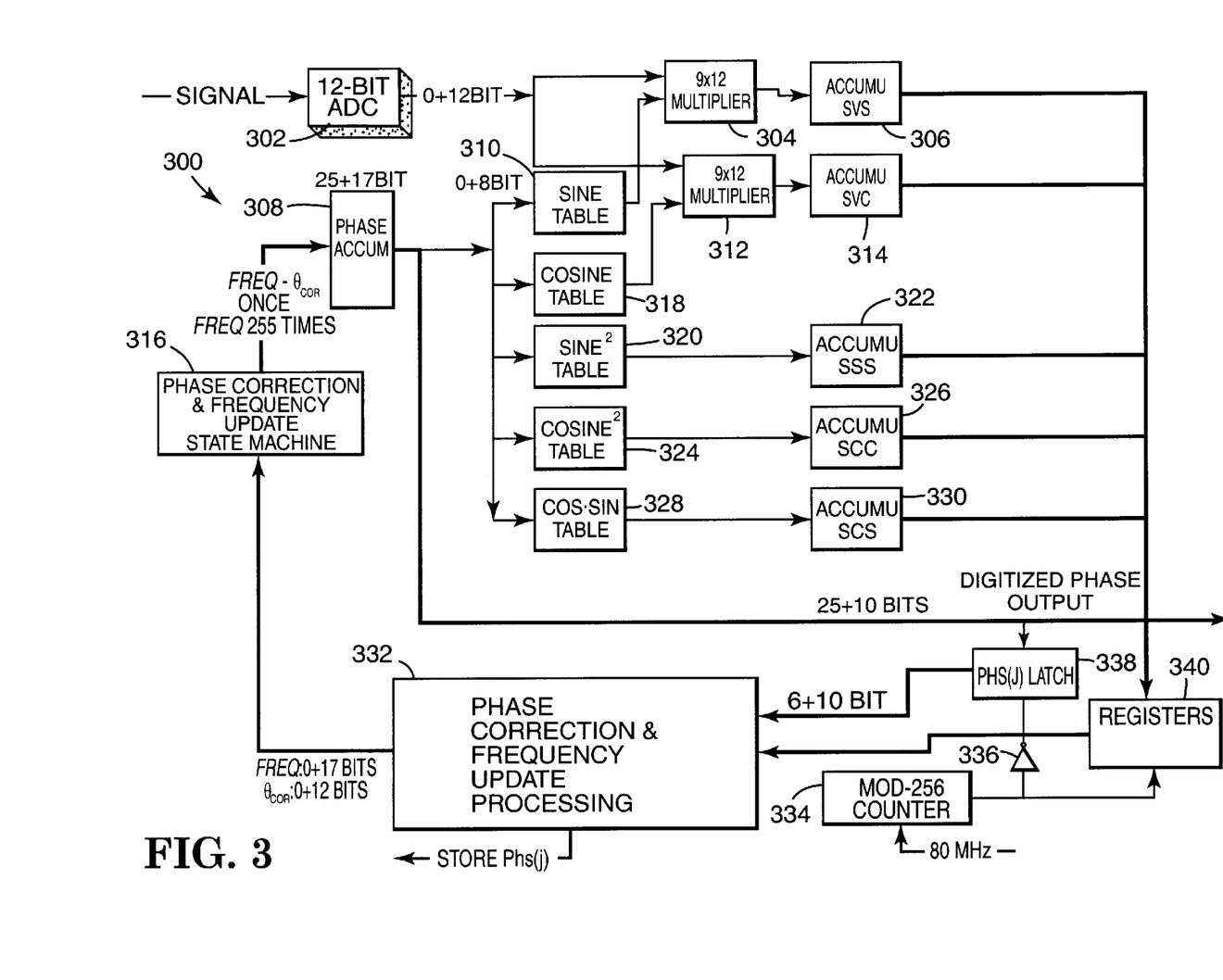
FIG. 3 is an electrical block diagram illustrating a second embodiment of a phase digitizer according to the present invention.

FIG. 3 is an electrical block diagram illustrating a second embodiment of a phase digitizer 300 according to the present invention. Phase digitizer 300 uses a point regression technique for phase digitizing in the steady state. As with FIG. 2, phase digitizing for only one channel (e.g., measurement or reference) is shown in FIG. 3.

Phase digitizer 300 includes analog-to-digital converter (ADC) 302, digital multiplier 304, accumulator 306, phase accumulator 308, sine table 310, digital multiplier 312, accumulator 314, phase correction and frequency update state machine 316, cosine table 318, sine table 320, accumulator 322, cosine² table 324, accumulator 326, cosine-sine table 328, accumulator 330, phase correction and frequency update processing block 332, counter 334, inverter 336, latch 338, and registers 340. In one embodiment, the digital circuits shown in FIG. 3 are clocked synchronously at a 80 MHz rate. The clocking circuit is omitted from FIG. 3 to simplify the illustration of the invention.

A 12-bit ADC 302 digitizes at 80 MHz the waveform of an incoming AC-coupled signal of unknown magnitude, frequency, and phase. In alternative embodiments, other sampling rates may be used. The output of ADC 302 is provided to digital multipliers 304 and 312.

A 42-bit phase accumulator 308 approximates the signal phase-progression $\phi(t_i)$ of the incoming analog signal, where the index "i" indicates a clock count value. Successive $t_i$'s are separated by $\tau$, the period of 80 MHz. The most significant 25 bits of phase accumulator 308 represent the numbers of whole UI in $\phi(t_i)$, and the remaining 17 bits represent fractional UI in $\phi(t_i)$. The increment value of phase accumulator 308, Freq, is the latest estimate of the signal frequency expressed in UI/$\tau$. An initial seed Freq value is used to start the phase digitizing operation, and is discussed below.

The most significant 8 bits of the fractional output of phase accumulator 308 are used to address five look-up tables (i.e., sine table 310, cosine table 318, sine² table 320, cosine² table 324, and cos·sin table 328). Look-up tables 310, 318, 320, 324, and 328 each span one complete period in the 8-bit address space. There are, therefore, 256 entries that span one period in each table 310, 318, 320, 324, and 328. Each entry in tables 310, 318, 320, 324, and 328 is 9 bits wide. The output of sine table 310 is presented to 9-by-12 digital multiplier 304. The output of cosine table 318 is presented to 9-by-12 digital multiplier 312. The 12-bit inputs of multipliers 304 and 312 are coupled to ADC 302.

The outputs of multipliers 304 and 312, and the outputs of tables 320, 324, and 328, are accumulated by accumulators 306, 314, 322, 326, and 330, respectively, which are set to increment at every clock pulse.

In one embodiment, the digitized data from ADC 302 is analyzed in 256-sample segments. A modulo-256 counter 334 sequences the events in each 256-clock segment. Counter 334 is coupled to Phs(j) latch 338 via inverter 336, and is also coupled to registers 340. At the negative transition of counter 334, halfway into a segment, 16 bits of output of phase accumulator 308 (6 bits of whole UI and 10 bits of fractional UI) are latched by Phs(j) latch 338. The latched value represents a temporary mid-segment value, Phs(j), which is held in reserve to be modified at the end of the segment. The letter "j" is an index for identifying segments.

At the positive transition of counter 334 at the end of a segment, the outputs of accumulators 306, 314, 322, 326, and 330 are latched into 5 registers 340, omitting the 3 least significant bits. The latched values are $S_{VS}$, $S_{VC}$, $S_{SS}$, $S_{CC}$, and $S_{CS}$, which are associated with accumulators 306, 314, 322, 326, and 330, respectively. Immediately after the values are latched, all five accumulators 306, 314, 322, 326, and 330 are reset to zero (reset circuit not shown) so that the accumulators are ready for the next segment.

The latched values of the five accumulators 306, 314, 322, 326, and 330 are digitally processed by phase correction and frequency update processing block 332 as shown in the following Equations X through XV:

$$A = S_{SS} \cdot S_{VC} - S_{CS} \cdot S_{VS} \qquad \text{Equation X}$$

$$B = -S_{CS} \cdot S_{VC} + S_{CC} \cdot S_{VS} \qquad \text{Equation XI}$$

From this point on, phase-digitizing processing is similar to the technique described above with respect to FIG. 2.

A phase correction value $\theta_{cor}$ is then ideally computed as follows:

$$\theta_{cor} = \text{Arctangent}(B/A)/2\pi \qquad \text{Equation XII}$$

Under steady state condition, however, the quotient B/A is generally small and Arctangent(B/A) is approximately equal to B/A. Therefore, $$\theta_{cor} \approx (B/A)/2\pi \qquad \text{Equation XIII}$$

A The phase correction value $\theta_{cor}$, which is always much less than ½, should be carried to 12 bits of accuracy.

The temporary mid-segment value Phs(j) latched by Phs(j) latch 338 is now corrected by $\theta_{cor}$ as follows:

$$Phs(j) = Phs(j) - \theta_{cor} \qquad \text{Equation XIV}$$

The corrected Phs(j), together with 320 values from past segments, are stored and exported as measured phase values. An updated frequency value, Freq, under steady state, is derived from the current value Phs(j) and two other historical values Phs(j−2) and Phs(j−4) saved two segments and four segments ago, respectively. One embodiment of the formulation for the new steady-state Freq is:

$$Freq = [2 \cdot Phs(j) - 3 \cdot Phs(j-2) + Phs(j-4)]/512 \qquad \text{Equation XV}$$

In one form of the invention, phase correction and frequency update processing block 332 is implemented as a FPGA. In an alternative embodiment, block 332 is implemented as a DSP processor.

In one embodiment, as soon as computation of $\theta_{cor}$ and Freq values is completed by phase correction and frequency update processing block 332, the increment value of phase accumulator 308 is modified by phase correction and frequency update state machine 316 to Freq−$\theta_{cor}$ for one clock cycle, then Freq for the next 255 clock cycles. The value of Freq, which is always no larger than ½, should be carried to a precision of 17 bits of fraction.

The above process is then repeated for the next 256-sample segment. Throughout the process, the clocked phase accumulator 308 output $\phi(t_i)$ serves as a good digitized approximation of the phase progression of the incoming analog signal to 25 bits of whole numbers and 10 bits of fractional numbers.

IV. Initial Phase Digitizing for Block Regression and Point Regression Embodiments At the start of the phase digitizing process, it is desirable to have an initial Freq value less than 1/512 off from the true (but unknown) Freq value for the moment. One embodiment for obtaining such an initial value of Freq is to perform a Digital Fourier transform on a set of the digital signal waveform samples. Several segments are then processed as described below until the phase digitizing process "locks on" to the frequency of the incoming analog signal (i.e., until steady state is reached).

A. Initial Frequency Value (Freq) Determination

Figure 4:
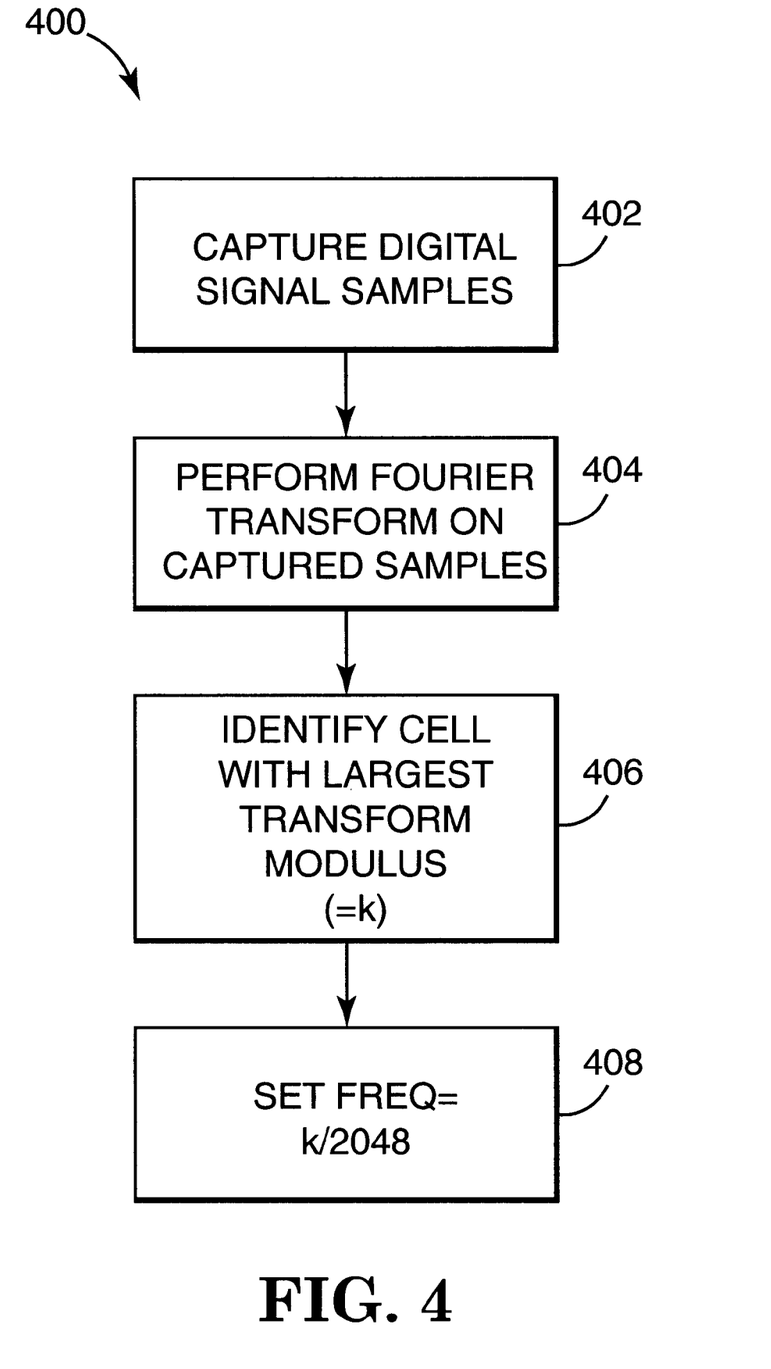
FIG. 4 is a flow diagram illustrating one embodiment of a process for determining an initial frequency value to begin a phase digitizing process.

FIG. 4 is a flow diagram illustrating a process 400 for determining an initial Freq value to begin a phase digitizing process. In one form of the invention, in step 402, 2048 samples of the incoming analog signal waveform are taken at a clock rate of 80 MHz, using ADC 202 or 302. In step 404, a digital Fourier transform (DFT), conveniently implemented by fast Fourier transform (FFT), is performed on the data set. In step 406, within the first 1024 elements of the transform, the cell that contains the largest transform modulus is identified. The transform modulus squared for each cell is the sum of the squares of the real and imaginary parts of the cell. In step 408, the value k/2048 is used as the initial Freq value for phase accumulator 204 or 308, where "k" represents the cell number of the cell with the largest transform modulus squared. The integer k is in the range 0 to 1023.

B. Initial Phase Digitizing Before Steady-State

In one embodiment, processing of the first six 256-sample segments by phase digitizers 200 and 300 differs from steady-state processing as shown in Table II below (by the seventh segment, steady-state is reached):

TABLE II

| Start | | Freq = k/2048, kth cell in the FFT has the largest modulus squared |
|---|---|---|
| 1st segment: | $\theta_{cor}$ = Arctangent(B/A)/2π; | New Freq = k/2048 (unchanged) |
| 2nd segment: | $\theta_{cor}$ = Arctangent(B/A)/2π; | New Freq = [Phs(2) − Phs(1)]/512 |
| 3rd segment: | $\theta_{cor}$ = (B/A)/2π; | New Freq = [Phs(3) − Phs(1)]/1024 |
| 4th segment: | $\theta_{cor}$ = (B/A)/2π; | New Freq = [Phs(4) + Phs(3) − Phs(2) − Phs(1)]/1024 |
| 5th segment: | $\theta_{cor}$ = (B/A)/2π; | New Freq = [Phs(5) + Phs(4) − Phs(3) − Phs(2)]/1024 |
| 6th segment: | $\theta_{cor}$ = (B/A)/2π; | New Freq = [Phs(6) + Phs(5) − Phs(4) − Phs(3)]/1024 |
| 7th segment: | $\theta_{cor}$ = (B/A)/2π; | New Freq = [2 Phs(7) − 3 Phs(5) + Phs(3)]/512 |
| STEADY STATE TRACKING (steady-state from here on) | | |
| 8th segment: | $\theta_{cor}$ = (B/A)/2π; | New Freq = [2 Phs(8) − 3 Phs(6) + Phs(4)]/512 |
| $j^{th}$ segment: | $\theta_{cor}$ = (B/A)/2π; | New Freq = [2 Phs(j) − 3 Phs(j − 2) + Phs(j − 4)]/512 |

In an alternative embodiment, the function (B/A) with hard-limits at ±¼ may be used to approximate the Arctangent function used in the first two segments. Convergence to the actual signal frequency may be slower using B/A rather than the Arctangent function.

V. Phase Digitizing in a Heterodyne Interferometry System

When the phase digitizing system of the present invention is used in metrology based on heterodyne interferometry, the hardware shown in FIGS. 2 and 3 is used for phase digitizing one of two channels: Measurement or Reference. In one embodiment, a second set of hardware substantially similar to the first set is used for phase digitizing the second channel. In the measurement channel, the signal is Doppler-shifted by reflection from a moving object. For the measurement channel, the output of phase accumulator 204 or 308 is $\phi_M(t_i)$, where the subscript "M" indicates the measurement channel. In the reference channel, the signal is not Doppler shifted. The output of phase accumulator 204 or 308 for the reference channel is $\phi_R(t_i)$, where the subscript "R" indicates the reference channel.

The digitized displacement $s(t_i)$ of the moving object at any time $t_i$ is given by the difference between the two phase progressions multiplied by one forth of the wavelength of the light wave, to within an arbitrary constant s(0):

$$s(t_i)-s(0)=[\phi_M(t_i)-\phi_R(t_i)]\cdot(\lambda/4) \quad \text{Equation XVI}$$

A. Signal Magnitude Estimate in Block Regression Embodiment

Provided that there is sufficient signal magnitude, only phase digitizing is necessary to measure displacement. To detect unexpected signal drop-out, it is desirable to monitor the magnitude of the signal. Using the embodiment shown in FIG. 2, the magnitude V(j) for the jth segment may be computed from the six data words $V_{24}$, $V_{13}$, $C_{24}$, $C_{13}$, $S_{24}$, and $S_{13}$ latched from the ALUs 208 for that segment as shown in the following Equations XVII and XVIII:

$$det=C_{13} \cdot S_{24}-C_{24} \cdot S_{13} \quad \text{Equation XVII}$$

$$V(j)=(A^2+B^2)^{1/2}/det \quad \text{Equation XVIII}$$

The variables A and B are the same ones that are used for phase digitizing, which are:

$$A=V_{13} \cdot S_{24}-V_{24} \cdot S_{13} \quad \text{Equation XIX}$$

$$B=-V_{13} \cdot C_{24}+V_{24} \cdot C_{13} \quad \text{Equation XX}$$

B. Signal Magnitude Estimate in Point Regression Embodiment

Using the embodiment shown in FIG. 3, the magnitude V(j) for the jth segment may be computed from the five data words $S_{VS}$, $S_{VC}$, $S_{SS}$, $S_{CC}$, and $S_{CS}$ latched from the five accumulators 306, 314, 322, 326, and 330 as shown in the following Equations XXI and XXII:

$$det=S_{CC} \cdot S_{SS}-S_{CS} \cdot S_{CS} \quad \text{Equation XXI}$$

$$V(j)=(A^2+B^2)^{1/2}/det \quad \text{Equation XXII}$$

The variables A and B are the same ones used for phase digitizing:

$$A=S_{SS} \cdot S_{VC}-S_{CS} \cdot S_{VS} \quad \text{Equation XXIII}$$

$$B=-S_{CS} \cdot S_{VC}+S_{CC} \cdot S_{VS} \quad \text{Equation XXIV}$$

In steady-state, V(j) is well approximated by (A/det), further simplifying computation if necessary.

Embodiments of the phase digitizing system and method described herein are based on sampling the waveform of the signal at a preset sampling frequency, and within limits, independent of the actual signal frequency. The same number of data points is used to digitize the signal phase. There are many more points than the minimum to generate the required result. Linear regression takes advantage of this redundancy to "average out" the noise present, thereby gaining precision. Because no "decision logic" (triggering) is used, noise increase results only in a gradual degradation of performance rather than a catastrophic result. Embodiments of the method employ only digital signal processing with no analog circuitry after analog-to-digital conversion.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of digitizing characteristic parameters of a quasi-sinusoidal analog signal of unknown magnitude, frequency and phase-offset, the method comprising:

digitizing the analog signal at a first sampling rate, thereby generating a plurality of sets of digital signal waveform samples; and digitally processing successive sets of the digital signal waveform samples to generate continually updated digital characteristic parameters representing a characteristic behavior of the quasi-sinusoidal analog signal.

2. The method of claim 1, wherein the digital characteristic parameters include a cumulative phase progression of the analog signal.

3. The method of claim 1, wherein the digital characteristic parameters include a phase-offset correction of the analog signal.

4. The method of claim 1, wherein the digital characteristic parameters include a magnitude estimate of the analog signal.

5. The method of claim 1, wherein the digital characteristic parameters include a frequency estimate of the analog signal.

6. The method of claim 1, wherein each set of digital signal waveform samples includes 256 samples.

7. The method of claim 1, wherein the first sampling rate is 80 MHz.

8. The method of claim 1, wherein the step of digitally processing successive sets comprises:

generating a best-fit estimate of the analog signal for each set of digital signal waveform samples.

9. The method of claim 8, wherein the best-fit estimate of the analog signal is of the form $V^*\cos[2\pi(\text{Freq}^*i-\theta)]$, wherein i is an index for identifying consecutive digital signal waveform samples within a set, V represents a magnitude estimate, Freq represents a frequency estimate, and $\theta$ represents a phase-offset estimate.

10. The method of claim 1, wherein the step of digitally processing successive sets is based on a block regression technique, wherein linear regression processing is applied to selected sums of digital signal waveform samples.

11. The method of claim 1, wherein the step of digitally processing successive sets is based on a point regression technique, wherein linear regression processing is applied to individual digital signal waveform samples.

12. A phase digitizing system comprising:

an analog-to-digital converter for generating a plurality of segments of digital signal waveform samples based on an incoming analog signal;

a digital phase accumulator; and a digital signal processor coupled to the analog-to-digital converter and the phase accumulator for digitally processing each segment of the digital signal waveform samples together with output of the phase accumulator and continually generating digital phase data, the digital signal processor configured to provide increment values to the digital phase accumulator based on the digital phase data, thereby causing the output of the digital phase accumulator to represent an instantaneous phase of the incoming analog signal.

13. The phase digitizing system of claim 12, wherein the digital phase data includes a phase correction value.

14. The phase digitizing system of claim 12, wherein the digital phase data includes a frequency update value.

15. The phase digitizing system of claim 12, wherein the digital phase data includes a magnitude estimate of the incoming analog signal.

16. The phase digitizing system of claim 12, wherein each segment of digital signal waveform samples includes 256 samples.

17. The phase digitizing system of claim 12, wherein the analog-to-digital converter generates digital signal waveform samples at 80 MHz.

18. The phase digitizing system of claim 12, wherein the digital phase data includes an initial frequency estimate of the incoming analog signal obtained by performing a Fourier transform on a set of the digital signal waveform samples.

19. The phase digitizing system of claim 12, wherein the digital phase accumulator is configured to generate a plurality of digital phase progression values based on current frequency values and current phase correction values, each digital phase progression value including a whole number portion and a fractional number portion.

20. The phase digitizing system of claim 19, wherein the digital signal processor comprises:

a cosine look-up table coupled to the digital phase accumulator for providing cosine values corresponding to the fractional portion of the digital phase progression values;

a sine look-up table coupled to the digital phase accumulator for providing sine values corresponding to the fractional portion of the digital phase progression values;

a first plurality of arithmetic logic units (ALUs) for arithmetically processing the cosine values and the sine values, each ALU in the first plurality configured to output a result value based on the arithmetic processing;

a second plurality of ALUs coupled to the analog-to-digital converter for arithmetically processing the digital signal waveform samples, each ALU in the second plurality configured to output a result value based on the arithmetic processing; and the digital signal processor configured to generate the current phase correction values based on the result values output by the first and the second plurality of ALUs, and configured to generate each current frequency value based on a current digital phase value and a plurality of past digital phase values.

21. The phase digitizing system of claim 20, wherein the digital signal processor further comprises:

a plurality of registers coupled to the ALUs for storing the result values.

22. The phase digitizing system of claim 21, wherein the digital signal processor further comprises:

a latch coupled to the phase accumulator for latching a digital phase progression value.

23. The phase digitizing system of claim 22, wherein the digital signal processor further comprises:

a counter coupled to the plurality of registers and the latch, the counter configured to cause the registers to store the result values at the end of each segment of digital signal waveform samples, the counter configured to cause the latch to latch a phase progression value substantially near the center of each segment of digital signal waveform samples.

24. The phase digitizing system of claim 23, wherein the digital signal processor is configured to generate each current digital phase value by subtracting a current phase correction value from the latched phase progression value.

25. The phase digitizing system of claim 19, wherein the digital signal processor comprises:

a first and a second plurality of trigonometric look-up tables coupled to the phase accumulator for providing trigonometric values corresponding to the fractional portion of the digital phase progression values;

a first digital multiplier coupled to one of the trigonometric look-up tables in the first plurality and coupled to the analog-to-digital converter, the first digital multiplier configured to multiply trigonometric values provided by the look-up table with digital signal waveform samples generated by the analog-to-digital converter and output result values;

a second digital multiplier coupled to a one of the trigonometric look-up tables in the first plurality and coupled to the analog-to-digital converter, the second digital multiplier configured to multiply trigonometric values provided by the look-up table with digital signal waveform samples generated by the analog-to-digital converter and output result values;

a first plurality of accumulators coupled to the first and the second digital multipliers for accumulating the result values output by the multipliers and outputting an accumulation result;

a second plurality of accumulators coupled to the second plurality of trigonometric look-up tables for accumulating the trigonometric values provided by the second plurality of trigonometric look-up tables and outputting an accumulation result; and the digital signal processor configured to generate the current phase correction values based on the accumulation results output by the first and the second plurality of accumulators, and configured to generate each current frequency value based on a current phase digital phase value and a plurality of past digital phase values.

26. The phase digitizing system of claim 25, wherein the digital signal processor further comprises:

a plurality of registers coupled to the first and the second plurality of accumulators for storing the accumulation results.

27. The phase digitizing system of claim 26, wherein the digital signal processor further comprises:

a latch coupled to the phase accumulator for latching a digital phase progression value.

28. The phase digitizing system of claim 27, wherein the digital signal processor further comprises:

a counter coupled to the plurality of registers and the latch, the counter configured to cause the registers to store the accumulation results at the end of each segment of digital signal waveform samples, the counter configured to cause the latch to latch a phase progression value substantially near the center of each segment of digital signal waveform samples.

29. The phase digitizing system of claim 28, wherein the digital signal processor is configured to generate each current digital phase value by subtracting a current phase correction value from the latched phase progression value.

30. A displacement measuring interferometry system comprising:

a light source for generating at least one light beam;

an interferometer for generating an optical measurement signal based on the at least one light beam;

a receiver for receiving the optical measurement signal and an optical reference signal, the receiver configured to generate an analog measurement signal based on the optical measurement signal and configured to generate an analog reference signal based on the optical reference signal;

at least one analog-to-digital converter for generating a plurality of sets of digital measurement signal waveform samples based on the analog measurement signal, the at least one analog-to-digital converter configured to generate a plurality of sets of digital reference signal samples based on the analog reference signal; and at least one digital signal processor coupled to the at least one analog-to-digital converter for digitally processing each set of the digital measurement signal waveform samples and the digital reference signal waveform samples, the at least one digital signal processor configured to generate digital measurement phase data representing an instantaneous phase of the analog measurement signal, the at least one digital signal processor configured to generate digital reference phase data representing an instantaneous phase of the analog reference signal.

31. The displacement measuring interferometry system of claim 30, wherein the digital signal processor is configured to generate digital phase difference data based on the digital measurement phase data and the digital reference phase data, the digital phase difference data representing a difference in the instantaneous phase of the analog measurement signal and the analog reference signal.

32. The displacement measuring interferometry system of claim 30, wherein the digital measurement phase data represents a phase progression of the analog measurement signal, and wherein the digital reference phase data represents a phase progression of the analog reference signal.

33. The displacement measuring interferometry system of claim 30, wherein the digital processing performed by the digital signal processor is based on a block regression technique, wherein linear regression processing is performed on sums of digital signal waveform samples.

34. The displacement measuring interferometry system of claim 30, wherein the digital processing is performed by the digital signal processor is based on a point regression technique, wherein linear regression processing is performed on individual digital signal waveform samples.

* * * * *